Nov. 5, 1963  C. SAURER  3,109,323
HYDRAULIC LOCKING DIFFERENTIAL
Filed Sept. 8, 1960  4 Sheets-Sheet 1

INVENTOR.
CURT SAURER
BY
FINN G. OLSEN
ATTORNEY

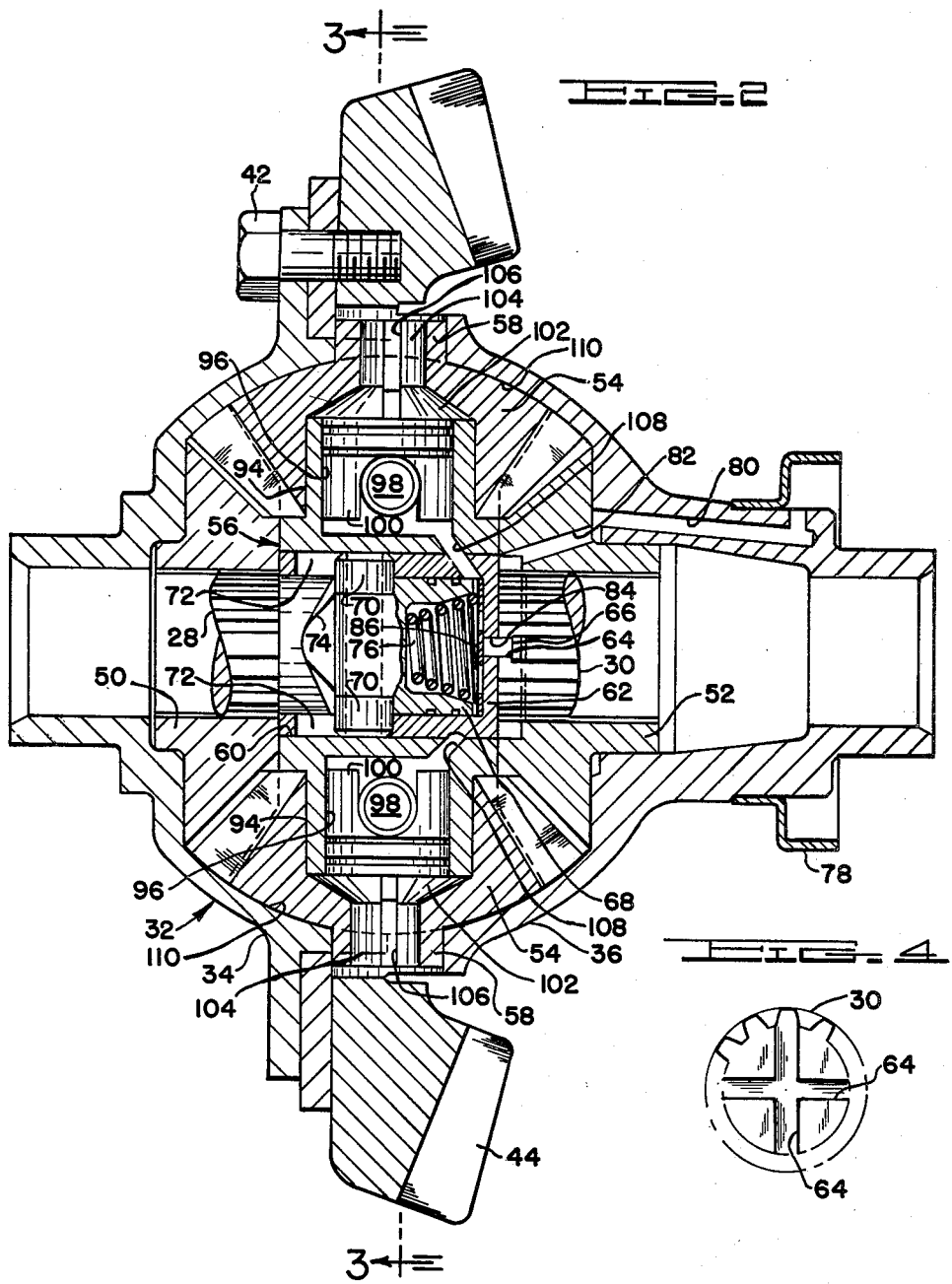

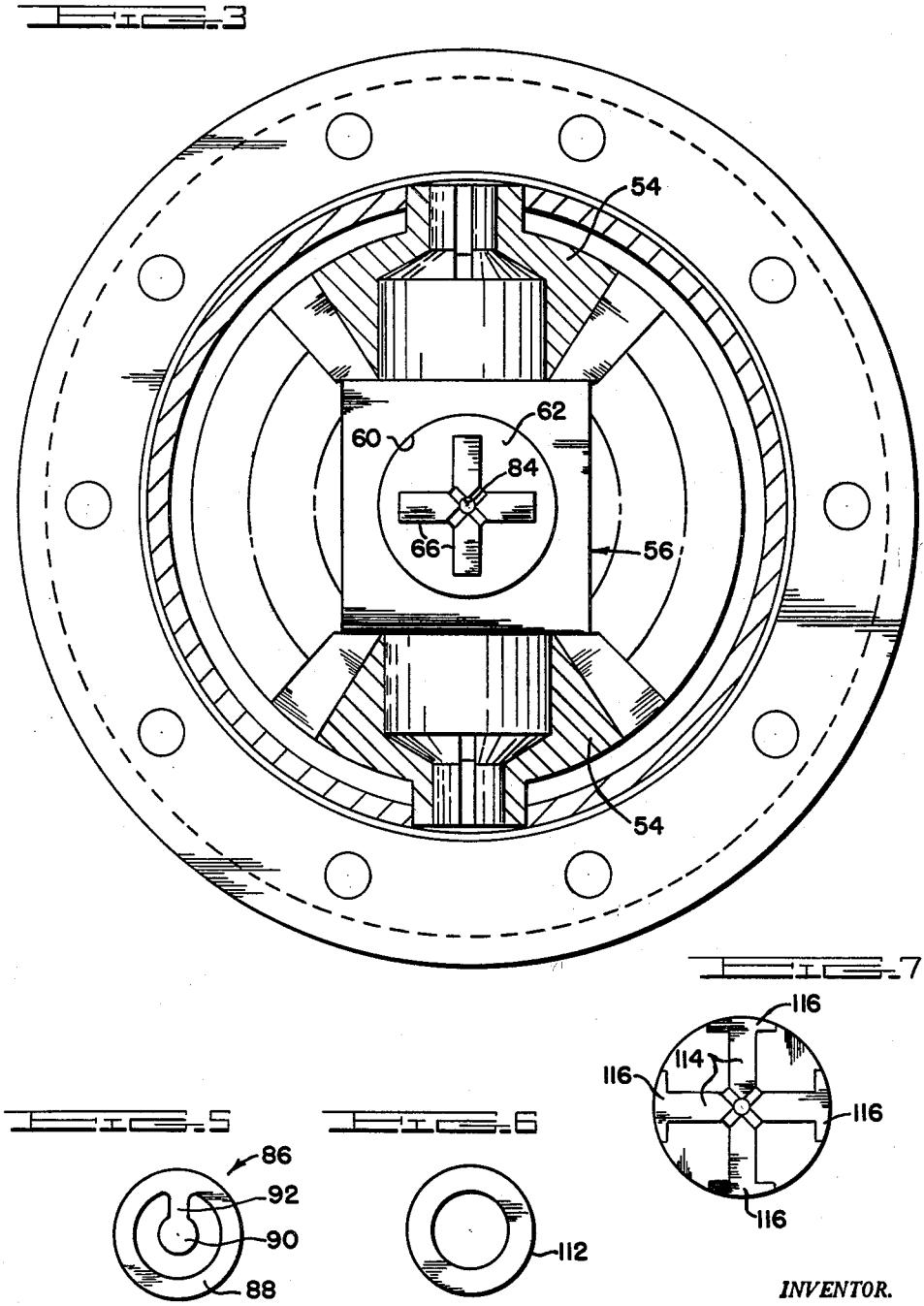
INVENTOR.
CURT SAURER
BY
FINN G. OLSEN
ATTORNEY

Nov. 5, 1963  C. SAURER  3,109,323
HYDRAULIC LOCKING DIFFERENTIAL
Filed Sept. 8, 1960  4 Sheets-Sheet 4
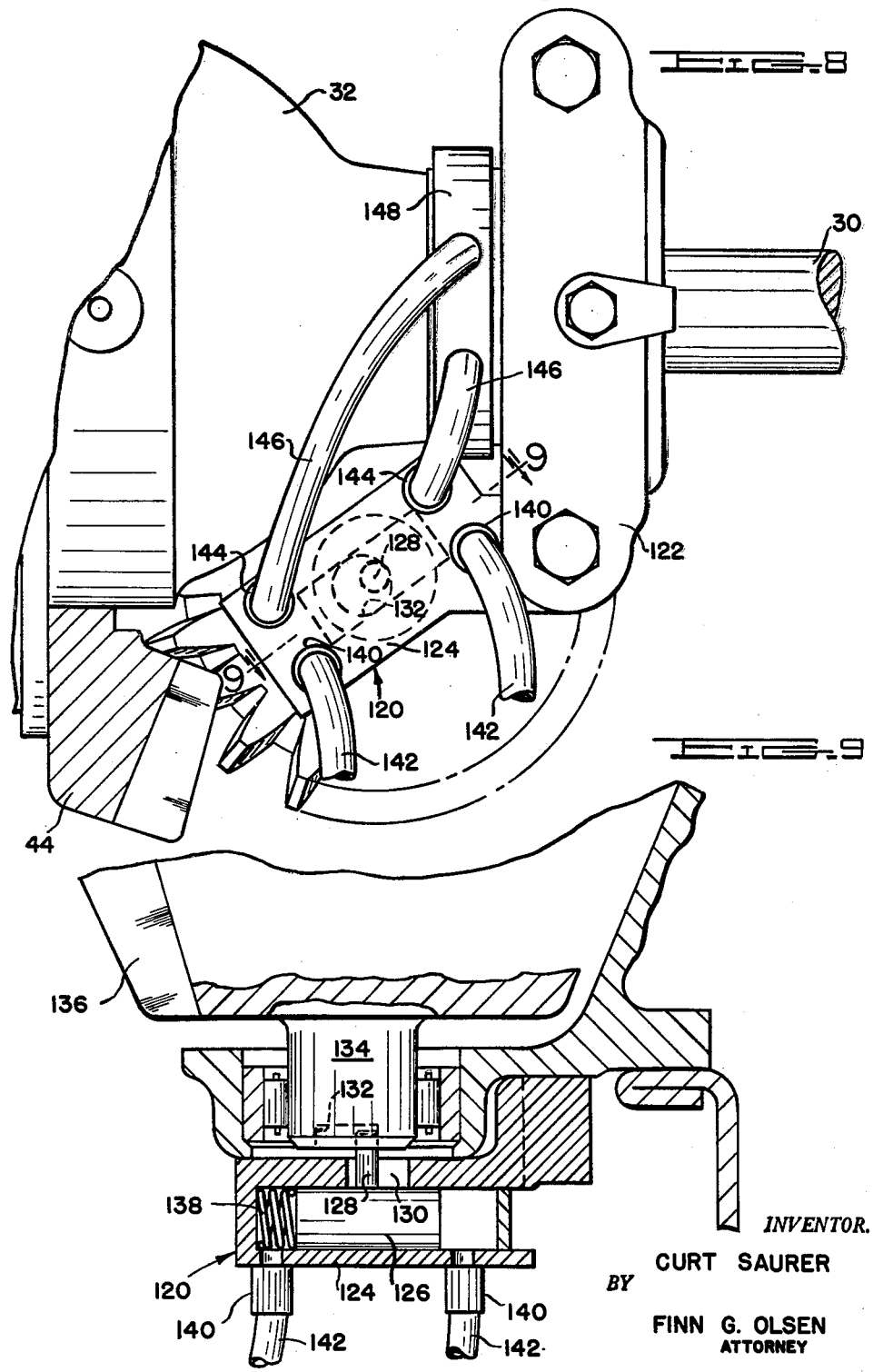
INVENTOR.
CURT SAURER
BY
FINN G. OLSEN
ATTORNEY

United States Patent Office 3,109,323
Patented Nov. 5, 1963

3,109,323
HYDRAULIC LOCKING DIFFERENTIAL
Curt Saurer, Oak Park, Mich., assignor to Thornton Products Company, Dearborn, Mich., a corporation of Michigan
Filed Sept. 8, 1960, Ser. No. 54,642
14 Claims. (Cl. 74—711)

The present invention relates to differential drives for vehicles, and particularly to a differential vehicle drive having a positive drive and differential action on the two driven axles. This application is a continuation-in-part of prior application Serial No. 16,339, filed March 21, 1960, now abandoned.

The conventional automobile differential which has been used from the beginning of the automotive industry was necessary to the operation of the vehicle in order to permit one of the rear wheels to operate at a different speed from the other rear wheel, such as occurs when the vehicle is driven around a corner. Difficulties have been experienced when using such a differential, because the same amount to torque is delivered to both rear axles, and the driving torque is limited to the wheel having the least amount of traction. If one of the wheels loses traction in mud, ice or like substances having a low coefficient of friction, the driving torque required to turn that wheel is quite low and is insufficient to turn the other wheel. Thus, if the vehicle is stationary, it cannot be moved by its own power, because the one wheel merely spins on the slippery substance.

In recent years much activity has occurred in the automotive industry in an effort to develop an improved differential which will permit differential action for turning corners and the like, and which will provide suitable locking of the differential action so that driving torque of sufficient magnitude will be available to both rear wheels to move the vehicle when one wheel is on a slippery substance. Some of the locking differentials that have made an appearance have been operable, but none of them have been completely satisfactory for various reasons. The defects of such locking differentials will not be discussed at length here, except to state that in general they are short lived, noisy, too complex for the automotive industry, too costly, or the like.

It is the principal object of the present invention to provide an improved differential adapted primarily but not exclusively for use with an automotive vehicle, which differential is constructed and arranged to provide differential action between the two driving axle shafts and which will operate automatically to restrict the differential action when one axle shaft begins to spin relative to the other axle shaft.

It is another object of the present invention to provide a differential of the foregoing character which is constructed and arranged so that the extent of locking action that occurs is a function of the rate of rotation of one axle shaft relative to the other axle shaft so that at low rates of relative turning the differential will function in the conventional manner and as the rate of relative turning is progressively increased, the extent of locking will increase.

It is another object of the present invention to provide a differential of the foregoing character which is constructed and arranged so that locking action of the differential is effected by holding opposite surfaces of at least one of the gears within the differential case in a vise-like grip.

It is still another object of the present invention to provide a differential of the foregoing character which contains hydraulic means for effecting the locking action and wherein the lubricating oil of the differential is utilized as the hydraulic fluid.

It is still another object of the present invention to provide a differential of the foregoing character which contains means for assuring a constant supply of lubricating oil to the hydraulic means for effecting the desired locking action.

It is still another object of the present invention to provide a locking type differential which is constructed and arranged so that it will not change the handling characteristics of the vehicle from those of a conventional differential.

It is still another object of the present invention to provide a locking type differential which is constructed and arranged so that it can readily be substituted as a replacement part for the conventional differential of a vehicle.

It is still another object of the present invention to provide a locking type differential which is characterized by the relatively few additional parts required when compared with a conventional differential so as to provide a comparatively low cost unit suitable for mass production practices of the automotive industry, and one which is characterized by its durability, quiet operation and long life.

It is still another object of the present invention to provide a locking type differential of the foregoing character which is constructed and arranged so that a failure of operation of the locking means will not impair the normal differential action of the differential.

Other objects of this invention will appear in the following description and appended claims, reference being had to the accompanying drawings forming a part of this specification wherein like reference characters designate corresponding parts in the several views.

In the drawings:

FIGURE 2 is an enlarged section of the differential showing in section details of the hydraulic pumping means used in the disclosed embodiment;

FIGURE 3 is a vertical section taken substantially on the line 3—3 of FIGURE 2 with the ring gear removed and other portions including the spider hub being shown in elevation;

FIGURE 4 is an end elevation of the inner end of the right wheel driving axle shaft shown in FIGURES 1 and 2;

FIGURE 5 is an elevation of a disk valve used with the hydraulic pumping means of the illustrated embodiment;

FIGURE 6 is an elevation of a ring that optionally may be used with the locking cylinders of the disclosed embodiment for control purposes;

FIGURE 7 is an end elevation of a modified form of a cylinder that may be used with the present invention;

FIGURE 8 is a fragmentary vertical rear elevation with the ring gear in section and showing a modified form of pump means that may be used to maintain a head of lubricating oil at the hydraulic pumping means of the present invention; and FIGURE 9 is a fragmentary section of the modified pump means taken substantially on the line 9—9 of FIGURE 8.

Figure 1:
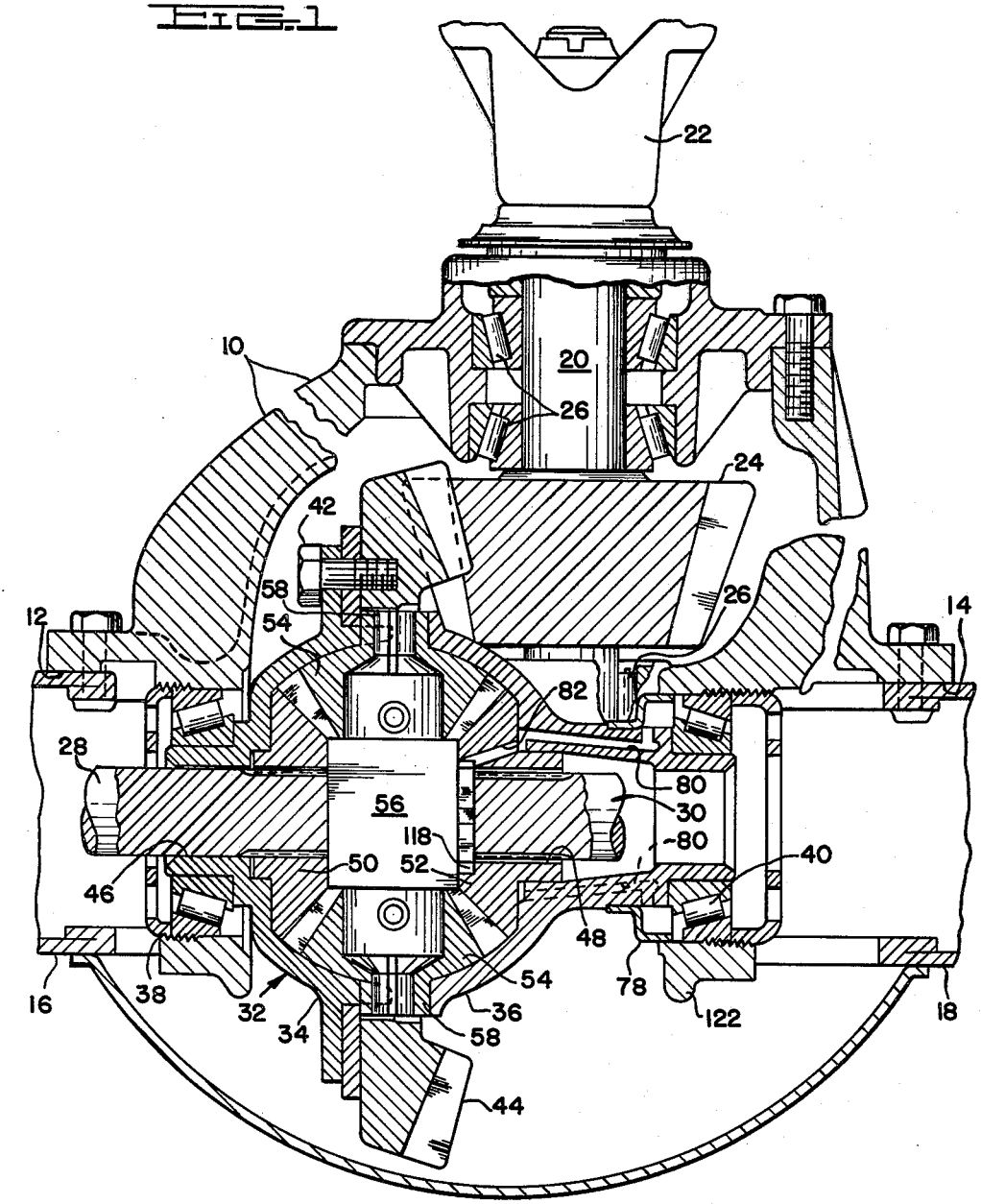
FIGURE 1 is a sectional view of a differential embodying one form of the present invention, the major portion of the view being a horizontal section through the axle shafts extending into the differential, and the remainder of the view being a fragmentary horizontal section immediately below the first-named horizontal section and passing through the axis of the driving pinion.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the embodiment of the invention illustrated in FIGURES 1-5, inclusive, will be described first. A differential housing 10 is provided with oppositely positioned axially aligned openings 12 and 14 in which are secured the axle housings 16 and 18. Extending into the forward end of the differential housing 10 is an input drive shaft 20 which has a universal joint yoke 22 at its outer end, and a bevel pinion 24 is secured on its inner end. The shaft 20 is suitably journalled in the roller bearings 26, as shown in FIGURE 1.

Wheel driving shafts 28 and 30 are coaxially disposed and extend from the axle housings 16 and 18 into the interior of the differential housing 10. A differential case 32, formed in two halves 34 and 36, is suitably journalled in the differential housing 10 by the roller bearings 38 and 40 so that the differential case 32 can revolve relative to the differential housing 10 about the axis of the wheel driving shafts 28 and 30. The two halves 34 and 36 of the differential case 32 are secured together by a plurality of bolts, one of which is shown at 42, which bolts also secure the ring gear 44 in coaxial relation to the outer side of the differential case 32 and in mesh with the pinion 24. Thus, rotation of the pinion 24 about its axis will permit rotation of the differential case 32 about the axis of wheel driving shafts 28 and 30 in the conventional manner.

The differential case 32 has openings 46 and 48 on opposite sides thereof in alignment with the openings 12 and 14 of the differential housing 10, and the driving axle shafts 28 and 30 extend through such openings 46 and 48 into the interior of the differential case 32 wherein the side gears 50 and 52 are splined thereon. Also positioned within the differential case 32 are the pinion gears 54 which are in mesh with the side gears 50 and 52. The pinion gears 54 are mounted on a spider 56 and have hub portions 58 journalled in the differential case 32 so that the pinion gears 54 can turn freely on their common axis. Thus, the gearing arrangement described above provides conventional differential action between the driving axle shafts 28 and 30.

The features of the present invention which are a departure from conventional differential action and which provide automatic locking action of the differential assembly under certain conditions will now be described, with particular reference to FIGURE 2 of the drawings. As there shown, the spider 56 has an axial bore defining a pump chamber 60. Located within the pump chamber 60 is a pump cylinder 62 which is open to the inner end of wheel driving axle shaft 28 and substantially closed to the inner end of wheel driving axle shaft 30. The inner end of the wheel driving axle shaft 30 has transversely positioned grooves 64 therein which are adapted to receive or mate with the cross-shaped projection 66 formed integrally on the substantially closed end of the pump cylinder 62. Thus, the pump cylinder 62 is keyed to the end of the wheel driving axle shaft 32 so that it will always rotate with wheel driving axle shaft 32. It will be understood that other arrangements may also be used for keying these members together, and the present invention contemplates use of any such suitable keying arrangement.

Located within the pump cylinder 62 is a pump piston 68 which has a pair of diametrically opposed cam followers 70 on its end adjacent the inner end of wheel driving axle shaft 28. The cam followers 70 project into longitudinal slots 72 so that the pump piston 68 can reciprocate in the pump cylinder 62 but cannot rotate relative thereto. Thus, the pump piston 68 must rotate with wheel driving axle shaft 30, but is free to reciprocate within pump cylinder 62.

The cam followers 70 are adapted to travel on the circular cam 74 formed on the inner end of the wheel driving axle shaft 28, which end projects into the open end of the pump cylinder 62. In order to urge the cam followers 70 continuously against the circular cam 74, a coil spring 76 is operatively maintained in compression between the pump piston 68 and the closed end of the pump cylinder 62. Therefore, whenever differential action occurs between the wheel driving axle shafts 28 and 30, the cam followers 70 will travel on the circular cam 74, thereby producing reciprocating action of the pump piston 68. As will be described, the reciprocating action of the pump piston 68, when differential action occurs between the shafts 28 and 30, is utilized to pump lubricating oil to provide frictional engagement of at least one of the differential gears with the inside wall of the differential case 32 so as to restrict the differential action between such shafts 28 and 30.

The source of supply of the lubricating oil used for this purpose is the normal supply that is contained within the differential housing 10. Attention is directed to FIGURES 1 and 2 for a description of one means provided for supplying such lubricating oil to the described pump cylinder 62. The roller bearing 40, by virtue of the position of its rollers will provide a pumping action of lubricating oil from right to left, as viewed in FIGURE 1, thereby causing lubricating oil to fill the space defined by the annular ring 78, and from there to flow through the plurality of oil passageways 80 formed in the wall of the differential case 32.

The oil passageways 80 communicate with a plurality of other oil passageways, one being shown at 82, which extend from the outer to the inner end of the differential side gear 52. These latter oil passageways 82 are in communication with the grooves 64 formed in the inner end of the wheel driving axle shaft 30. Finally, communication exists between the grooves 64 and the interior of the pump cylinder 62 by means of the suction inlet or port 84 in the substantially closed end wall of the pump cylinder 62. Thus, a small head of lubricating oil will be maintained constantly at the suction inlet 84 by pumping action of the roller bearing 40 when the shaft 30 is in motion. Also, there normally will be sufficient oil trapped in these passageways when shaft 30 is stopped to permit initial starting action of the locking features of the differential when drive pinion 24 is initially started.

The lubricating oil at the suction inlet 84 will flow into the pump cylinder 62 when the pump piston moves to the left, as seen in FIGURE 2, but will not be able to flow back through suction port 84 on the return stroke of pump piston 68 because of the presence in the pump cylinder 62 of the check or flapper valve 86. As shown in FIGURE 5, the flapper valve has an annular portion 88 and a central portion 90 joined to the annular portion 88 by the spring arm 92. Other suitable check valves, such as needle or ball type check valves, may be used.

The flapper valve 86 is maintained in position with the central portion 90 closing the suction inlet 84, by the coil spring 76 which is seated on the annular portion 88. In this position, flapper valve 86 functions to permit lubricating oil to flow into the piston cylinder 62 when the pump piston 68 moves to the left and functions to close the suction port 84 preventing discharge of lubricating oil therethrough when the piston pump 68 moves to the right.

Referring again more particularly to FIGURE 2, the elements for effecting locking action of the differential and which are responsive to the lubricating oil pumped from the pump cylinder 62 as well as the discharge circuits employed will be described.

The radially extending legs 94 of the spider 56 have the pinion gears 54 rotatably positioned thereon. Such legs 94 are bored to define therein piston chambers 96 open at their outer ends. Mounted in the legs 94 and extending across the piston chambers 96 are the piston pins 98. Straddling the pins 98 so as to hold them against rotation and fitting into the piston chambers 96 are the locking pistons 100. The latter have enlarged conical portions 102 which overlie the ends of the legs 94 with the conical surfaces fitting into complementary surfaces formed on the inner bores of the pinion gears 54. Thereafter, the conical portions 102 merge into small cylindrical portions 104 which are positioned in bores in the hub portions 58 of such pinion gears 54. The conical portions 102 and cylindrical portions 104 have passageways or grooves 106 providing fluid communication between the piston chambers 96 and the exterior of the differential case 32. The grooves 106 also serve as a source of lubricating oil for the inner surfaces of pinion gears 54. The piston chambers 96 are also in communication with the pump cylinder 62 by means of the passageways 108.

Thus, whenever differential action occurs between wheel driving axle shafts 28 and 30 causing pump piston 68 to reciprocate, the lubricating oil will be discharged from the pump cylinder 68 via the discharge passageways 108 to the piston chambers 96. This will have the effect of urging the locking pistons outwardly of the spider legs 96 so that the conical portions 102 will be pressed against the complementary surfaces of the pinion gears 54 urging the latter into frictional engagement with the inner surface 110 of the differential case 32. When this occurs, the differential pinion gears 54 will no longer be freely rotatable on their common axis, resulting in restricting or completely preventing differential action between the wheel driving axle shafts 28 and 30. By virtue of the described construction and arrangement whereby the locking pistons 100 are held against rotation and the surfaces of the pinion gears 54 fit against the complementary surfaces of the conical portions 102 and the inner surface of the differential case 32, the pinion gears 54 will in effect be held in a vice-like grip when maximum outward pressures are exerted by the pistons 100. Other suitable means than the pins 92 may also be used to prevent rotation of the pistons 100 to assure such vice-like gripping action.

The locking pistons 100 fit within the piston chambers 96 so that the lubricating oil pumped into the latter can flow at restricted rates or leak past the locking piston 100 and through the grooves 106 back into the lubricating oil reservoir formed by the differential housing 10. By virtue of this arrangement, when the differential action between the wheel driving axle shafts 28 and 30 is relatively slight, as may occur when the vehicle is traveling around a small bend in a road, there will be substantially free differential action. This will necessarily occur so long as the rate of displacement of the lubricating oil in pump cylinder 62 resulting from reciprocation of pump piston 68 does not exceed the rate at which such pumped lubricating oil can by-pass or leak past locking pistons 100. The locking action becomes progressively tighter as the relative rotation between the wheel driving axle shafts 28 and 30 becomes progressively greater so that differential action substantially ceases when one of shafts 28 and 30 begins to spin freely relative to the other as would occur if the vehicle were stationary and one wheel were on ice. Under these circumstances the differential action would stop almost instantaneously by the locking action of the locking pistons 100 and driving torque would be transmitted evenly through the differential to both wheel driving axle shafts 28 and 30. From the foregoing, it can be understood that the amount of by-pass permitted of lubricating oil around locking pistons 100 will determine in advance the allowable differential action that can occur between the shafts 28 and 30 before the locking action occurs. Thereafter, as progressively greater differential action occurs, progressively greater locking action will occur. Thus, the undesirable differential action which occurs when one shaft spins freely relative to the other shaft is substantially eliminated by the present invention, while the desired differential action which occurs when the vehicle turns corners, and the like, may continue in substantially the normal and conventional manner.

One of the features of this invention is the quiet operation that occurs. There are no moving parts, other than the conventional moving parts, when no differential action occurs. When excessive differential action occurs, causing locking action, there again are no moving parts, other than conventional differential parts while the differential is thus locked. Only when there is permitted differential action will the pump piston 68 reciprocate, and then it will be cushioned by the lubricating oil, assuring substantially noiseless operation.

As previously stated, the locking pistons 100 are held against rotation within the spider legs 94 by the piston pins 98 or other suitable means. These pins also serve to maintain the inner ends of the locking pistons 100 in spaced relation with respect to the inner end walls of the piston chambers 96, thereby providing a space into which the pumped lubricating oil can flow for exerting pressure equally over the entire inner ends of the locking pistons 100 and not merely over the portions of the pistons which otherwise would cover the openings defined by the passageways 108.

In some instances it may be desired to maintain the locking pressure on the pistons 100 continuously during the reciprocating action of the pump piston 68. For this purpose, washers, such as shown in FIGURE 6 at 112, may be inserted into the spaces between the inner ends of the locking pistons 100 and the inner ends of the piston chambers 96, thereby restricting the return flow of oil to the pump cylinder 62. This would have the effect of eliminating pulsating action that otherwise might occur during the locking action.

It is also contemplated that washers may be positioned between the inner surface of the differential case 32 and the outer faces of the side gears 50 and 52 and the pinion gears 54. These are of a conventional design and are not shown. However, it is intended that such arrangements come within the scope of the claims of this application.

There may also be occasions when it is desired that close alignment exist between the closed end of the pump cylinder and the right side gear. Under these circumstances the pump cylinder may be modified as shown in FIGURE 7. In this embodiment the elements are the same as the previously described pump cylinder 62 except that the cross-shaped projection 114 has outer end portions 116 which are adapted to fit into the recess 118, FIGURE 1, in the inner surface of the side gear 52.

It is also contemplated that other pump means than that provided by the pumping action of roller bearing 40 may be used to supply a head of lubricating oil to the pump cylinder 62. For example, military vehicles may require a more positive source of oil, particularly after the vehicle has remained idle for extended periods of time in cold or winter regions. Attention is directed to the embodiment illustrated in FIGURES 8 and 9, which figures show a modified construction and arrangement for carrying out this function. As there shown, a double acting piston pump 120 is suitably mounted on the cap member 122 which encloses the roller bearing 40, as is shown in FIGURE 1.

The double acting piston pump 120 has a pump housing 124 which encloses the piston 126. The latter has a pin 128 which projects through the longitudinal slot 130 and into an eccentric bore 132 formed in the end 134 of the bevel pinion 136. A coil spring 138 functions to urge the piston 126 to the right as seen in FIGURE 9 so that the pin 128 will act as a follower on the right surface of the eccentric bore 132; and when the bevel pinion 136 rotates, the piston 126 will reciprocate within the housing 124.

Located at opposite ends of the housing 124 are ball check valves 140, of a conventional character which permit flow into the housing 124 and prevent discharge therefrom. These check valves 140 have their inlet ends connected to the conduits or tubes 142 which extend to the bottom of the differential housing 10. Also located at the opposite ends of the housing 124 are the ball check valves 144 which permit discharge from housing 124 to the conduits or tubes 146. These conduits 146 are connected to the annular ring 148 which serves the same function as the annular ring 78 of the embodiment shown in FIGURE 1. Thus, the double-acting piston pump 120 functions to maintain a positive pressure head of lubricating oil at the pump cylinder 62, FIGURE 2. It is to be understood that other suitable pumps, such as vane pumps, gear pumps, and the like may be substituted for the double-acting piston pump 120. The disclosed double-acting piston pump 120 has the desirable characteristic that its piston 126 will center itself along its longitudinal axis when the discharge oil pressure exceeds the effective spring pressure exerted by spring 138 on piston 126. Thus, by selecting a spring 138 having suitable spring characteristics the piston pump 120 will be limited so that it can not discharge oil above a desired pressure. By virtue of this arrangement excessive pressures will be avoided on the suction side of the flapper valve 86 so that the operation of the latter will not be impaired.

From the foregoing it will be understood that the present invention provides a simple self-locking differential assembly which requires no additional space than the conventional differential so that the self-locking differential assembly of the present invention can be used as a replacement for conventional differentials in existing military or other vehicles. Furthermore, in the event the self-locking features of the disclosed differential fail to lock, the differential will continue to function as a conventional differential.

Having thus described my invention, I claim:

1. In combination, a differential housing adapted to contain lubricating oil and having oppositely disposed openings therein to which axle shaft housings are adapted to be fitted, coaxial wheel driving shafts extending into said housing through said openings, a differential drive mechanism disposed within said housing and including a drive pinion, a differential case rotatably mounted on the axis of said shafts and carrying a ring gear coaxially disposed around its outer periphery and in mesh with said drive pinion, differential side gears positioned within said case and mounted on said wheel driving shafts for rotation therewith, a spider coaxially arranged within said case for rotation therewith and having its legs extending radially outwardly, differential pinion gears rotatably mounted on the legs of said spider and in mesh with said side gears, said pinion gears being movable outwardly on their axes for effecting frictional engagement with the inner wall of said case and thereby to restrict free rotation of the pinion gears relative to the case, said legs of the spider having piston chambers therein opening to the outer ends thereof, pistons in said chambers adapted when urged outwardly to move said pinion gears into effective frictional engagement with said case, the hub of said spider defining a pump chamber therein, passageways communicating between said pump chamber and the inner ends of said piston chambers, other passageways communicating between said pump chamber and the lubricating oil-containing portion of said housing, means in said housing operable to establish a pressure head of lubricating oil at said pump chamber, and pump means within said pump chamber responsive to relative turning of said driving shafts to supply lubricating oil under pressure to said piston chambers to move said pistons for restricting turning of said pinion gears relative to said case and thereby relative turning of said driving shafts with respect to one another.

2. The combination claimed in claim 1 wherein said means in said housing operable to establish a pressure head of lubricating oil at said pump chamber comprises a roller thrust bearing operably mounted between said case and said differential housing and a casing enclosing one end of said bearing and forming a part of said other passageways.

3. The combination claimed in claim 1 wherein said means in said housing operable to establish a pressure head of lubricating oil at said pump chamber comprises a pump operably mounted in said other passageways and driven by said pinion.

4. In combination, a differential housing adapted to contain lubricating oil and having oppositely disposed openings therein, coaxial wheel driving shafts extending into said housing through said openings, a differential drive mechanism disposed within said housing and including a drive pinion, a differential case rotatably mounted on the axis of said shafts and carrying a ring gear in mesh with said drive pinion, a set of differential side gears positioned within said case and mounted on said wheel driving shafts for rotation therewith, a set of differential pinion gears in mesh with said set of differential side gears and mounted for turning with said case, the gears of one of said sets being movable outwardly on their axes for effecting frictional engagement with the inner wall of said case and thereby restricting free rotation of the side gears relative to the case, means in said case operable in response to fluid pressure for engaging the inner sides of the gears of said one set and urging them axially outwardly, pump means within said case responsive to relative turning of said driving shafts to deliver lubricating oil under pressure to the first-named means so as to urge said one set axially outwardly to effect clamping action of the gears of said one set between said first-named means and said case.

5. In combination, a differential housing having oppositely disposed openings therein, coaxial wheel driving shafts extending into said housing through said openings, a differential drive mechanism disposed within said housing and including a drive pinion, a differential case rotatably mounted on the axis of said shafts carrying a ring gear in mesh with said drive pinion, a set of differential side gears positioned within said case and mounted on said wheel driving shafts for rotation therewith, a set of differential pinion gears in mesh with said set of differential side gears and mounted for turning with said case, the gears of one of said sets being movable outwardly on their axes for effecting frictional engagement with the inner wall of said case and thereby restricting free rotation of the side gears relative to the case, first means in said case responsive to axial thrust to engage frictionally and to urge said one set of gears axially outwardly, and other means in said case responsive to relative turning of said driving shafts to effect progressively greater axial thrust upon said first means as the relative rotation of said driving shafts is progressively increased.

6. In combination, a differential housing adapted to contain lubricating oil and having oppositely disposed openings therein, coaxial wheel driving shafts extending into said housing through said openings, a differential drive mechanism disposed in said housing and including a drive pinion, a differential case rotatably mounted on the axis of said shafts and carrying a ring gear in mesh with said drive pinion, differential side gears positioned within said case and mounted on said wheel driving shafts for rotation therewith, differential pinion gears in mesh with said side gears and mounted for turning with said case, said pinion gears being movable outwardly on their axes for effecting frictional engagement with the inner wall of said case and thereby restricting free differential rotation of the side gears relative to the case, piston means associated with said pinion gears and operable in response to action of lubricating oil under pressure to urge said side gears outwardly, by-pass means associated with said piston means permitting limited passage of said oil past said piston means so as to control the effective oil pressure acting on said piston means, and pump means responsive to relative rotation of said driving shafts for pumping lubricating oil under pressure to said piston means.

7. In combination, a differential housing adapted to contain lubricating oil and having oppositely disposed openings therein, coaxial wheel driving shafts extending into said housing through said openings, a differential drive mechanism disposed in said housing and including a drive pinion, a differential case rotatably mounted on the axis of said shafts and carrying a ring gear in mesh with said drive pinion, differential side gears positioned within said case and mounted on said wheel driving shafts for rotation therewith, differential pinion gears in mesh with said side gears and mounted for turning with said case, said pinion gears being movable outwardly on their axes for effecting frictional engagement with the inner wall of said case and thereby restricting free differential rotation of the side gears relative to the case, piston means associated with said pinion gears and operable in response to action of lubricating oil under pressure to urge said side gears outwardly, and pump means responsive to relative rotation of said driving shafts for pumping lubricating oil under pressure to said piston means, said pump means comprising a circular cam projecting from the inner end of one of said driving shafts, means defining a pump cylinder projecting from the inner end of the other driving shaft and enclosing said circular cam, a reciprocable piston in said cylinder adapted to rotate with said other driving shaft and having a follower portion adapted to ride on said cam, spring means urging said reciprocable piston against said circular cam so that when relative rotation occurs between said shafts said reciprocable piston will reciprocate, means for supplying lubricating oil to said pump cylinder, and a passageway providing communication between said pump cylinder and said piston means so that when said reciprocable piston reciprocates lubricating oil under pressure will be pumped to said piston means.

8. In combination, a differential housing adapted to contain lubricating oil and having oppositely disposed openings therein, coaxial wheel driving shafts extending into said housing through said openings, a differential drive mechanism disposed within said housing and including a drive pinion, a differential case rotatably mounted on the axis of said shafts and carrying a ring gear in mesh with said drive pinion, differential side gears positioned within said case and mounted on said wheel driving shafts for rotation therewith, a spider coaxially arranged within said case for rotation therewith and having its legs extending radially outwardly, said legs having piston chambers opening to the outer ends thereof, pistons in said chambers projecting from the open ends thereof and having shoulders overlying the ends of said legs, differential pinion gears rotatably mounted in said case in mesh with said side gears and having bores therethrough shaped to conform to the outer dimensions of said spider legs and the projecting portions of said pistons, said pinion gears having outer surfaces adapted to be urged outwardly into frictional engagement with the inner wall of said case, pump means within the hub of said spider responsive to relative turning of said driving shafts to deliver lubricating oil under pressure to said piston chambers to urge said pistons and thereby said pinion gears outwardly.

9. The combination claimed in claim 8 wherein cooperating means are provided between said pinion gears and said pistons for maintaining the inner ends of the latter in spaced relation from the inner ends of said piston chambers so that maximum effective areas of the pistons are available at all times on which the lubricating oil can act.

10. A fluid locking differential comprising driving means, driver means including a differential case operatively connected to said driving means, a differential pinion gear rotatably disposed in said case, side gears operatively meshed with said differential pinion gear, wheel-driving shafts connected to said side gears, fluid motor means mounted in said case and responsive to fluid under pressure to effect frictional clamping action of said pinion gear between said fluid motor means and said case so as to restrict relative movement between said differential pinion gear and said case and thereby to restrict relative turning between said side gears, pump means mounted in said case and responsive to relative turning of said wheel-driving shafts for supplying fluid under pressure to said fluid motor means.

11. A fluid locking differential as claimed in claim 10 wherein said fluid motor means is constructed and arranged to progressively increase the restriction of relative movement between the differential pinion gear and the case when the pressure of the fluid supplied by the pump means is progressively increased.

12. A fluid locking differential as claimed in claim 11 wherein said fluid motor means includes a fluid pressure responsive clamping member and includes by-pass means permitting passage of limited quantities of the fluid supplied by the pump means around said clamping member so that the restricting action of the locking means will be insufficient to prevent differential action of said wheel-driving shafts when the differential turning of said wheel-driving shafts is relatively low.

13. In combination, a differential housing adapted to contain lubricating oil and having oppositely disposed openings therein, coaxial wheel driving shafts extending into said housing through said openings, a differential drive mechanism disposed within said housing and including a drive pinion, a differential case rotatably mounted on the axis of said shafts carrying a ring gear in mesh with said drive pinion, differential side gears positioned within said case and mounted on said wheel driving shafts for rotation therewith, at least one differential pinion gear in mesh with said differential side gears and mounted for turning with said case, at least one of the differential gears in said case being movable on its axis to effect frictional engagement thereof with respect to said case and thereby to restrict rotation of the side gears relative to one another, first means in said case responsive to fluid pressure for frictionally engaging and urging said one of the differential gears axially into frictional engagement with said case, and second means in said case responsive to relative turning of said drive shafts to deliver lubricating oil under pressure to said first means.

14. A differential drive mechanism comprising a housing; a differential case rotatably mounted in the housing and containing differential gearing including two side gears adapted to be drivingly connected to separate axle shafts and differential pinions meshed with the side gears and mounted for turning with the differential case, such differential pinions being axially movable into frictional engagement with the differential case, and pistons mounted for axial movement of said differential pinions; and a pump responsive to relative rotation of the side gears for supplying fluid under pressure to said pistons for moving the same axially of said differential pinions, the arrangement being such that upon relative rotation of the side gears the pressure fluid urges the pistons in a direction such that the differential pinions are moved axially and are frictionally engaged between the pistons and the differential case.

References Cited in the file of this patent

UNITED STATES PATENTS

| | | |
|---|---|---|
| 1,396,225 | Logue et al. | Nov. 8, 1921 |
| 2,650,507 | Clintsman | Sept. 1, 1953 |
| 2,821,096 | Lyeth | Jan. 28, 1958 |
| 2,850,922 | Welsh | Sept. 9, 1958 |

FOREIGN PATENTS

| | | |
|---|---|---|
| 499,048 | Great Britain | Jan. 18, 1939 |
| 654,224 | Germany | Dec. 18, 1937 |